United States Patent
Yasuda et al.

(10) Patent No.: US 9,525,609 B2
(45) Date of Patent: Dec. 20, 2016

(54) RELAY SYSTEM AND SWITCHING DEVICE

(71) Applicant: Hitachi Metals, Ltd., Minato-ku, Tokyo (JP)

(72) Inventors: Makoto Yasuda, Tsuchiura (JP); Shigeru Tsubota, Tsuchira (JP)

(73) Assignee: Hitachi Metals, Ltd., Tokyo (JP)

( * ) Notice: Subject to any disclaimer, the term of this patent is extended or adjusted under 35 U.S.C. 154(b) by 97 days.

(21) Appl. No.: 14/683,302

(22) Filed: Apr. 10, 2015

(65) Prior Publication Data

US 2015/0312121 A1 Oct. 29, 2015

(30) Foreign Application Priority Data

Apr. 28, 2014 (JP) ................................ 2014-093142

(51) Int. Cl.

| H04L 12/26 | (2006.01) |
|---|---|
| H04L 25/20 | (2006.01) |
| H04L 12/703 | (2013.01) |
| H04L 12/721 | (2013.01) |
| H04L 12/24 | (2006.01) |

(52) U.S. Cl.
CPC ........... *H04L 43/0811* (2013.01); *H04L 25/20* (2013.01); *H04L 41/0686* (2013.01); *H04L 45/28* (2013.01); *H04L 45/66* (2013.01)

(58) Field of Classification Search
CPC .. H04L 43/0811; H04L 41/0686; H04L 25/20; H04L 45/28; H04L 45/66
See application file for complete search history.

(56) References Cited

U.S. PATENT DOCUMENTS

| 2011/0292931 A1* | 12/2011 | Kizawa | H04L 45/586 370/354 |
| 2015/0288559 A1* | 10/2015 | Yasuda | H04L 41/0654 370/217 |
| 2015/0288620 A1* | 10/2015 | Yasuda | H04L 49/25 370/401 |

FOREIGN PATENT DOCUMENTS

| JP | 2011-250185 A | 12/2011 |
| JP | 2012-209984 A | 10/2012 |

* cited by examiner

*Primary Examiner* — Christopher Grey
(74) *Attorney, Agent, or Firm* — Crowell & Moring LLP

(57) ABSTRACT

A first fault monitoring unit monitors presence/absence of fault on a communication path between bridge ports, and a second fault monitoring unit monitors presence/absence of fault on a communication path via a ring network between upper link ports. A third fault monitoring unit monitors presence/absence of fault at a MCLAG port. When a monitoring result by the third fault monitoring unit changes from absence of fault to presence of fault, a MCLAG control unit transmits a fault notification frame. At this time, when a monitoring result by the first fault monitoring unit is absence of fault, the MCLAG control unit transmits the fault notification frame from the bridge port, and when the monitoring result by the first fault monitoring unit is presence of fault and a monitoring result by the second fault monitoring unit is absence of fault, it transmits the fault notification frame from the upper link port.

12 Claims, 10 Drawing Sheets

FIG. 9A

FDB: ADDRESS TABLE

| MAC ADDRESS | VID | PORT ID/ MCLAG ID |
|---|---|---|
| MA1 | xxx | {MCLAG1} |
| MA2 | xxx | {MCLAG2} |
| ... | ... | ... |
| MA3 | xxx | {Pb} |
| ... | ... | ... |

FIG. 9B

14: PORT CONTROL TABLE

| PORT ID/ MCLAG ID | CONTROL STATE |
|---|---|
| {MCLAG1} | P |
| {MCLAG2} | P |
| ... | ... |

RELAY SYSTEM AND SWITCHING DEVICE

CROSS-REFERENCE TO RELATED APPLICATION

The present application claims priority from Japanese Patent Application No. 2014-093142 filed on Apr. 28, 2014, the content of which is hereby incorporated by reference into this application.

TECHNICAL FIELD OF THE INVENTION

The present invention relates to a relay system and a switching device, for example, a relay system to which a device-level redundancy using two switching devices is applied.

BACKGROUND OF THE INVENTION

Japanese Patent Application Laid-Open Publication No. 2011-250185 (Patent Document 1) discloses a network system in which an inter-device link aggregation is set on each link between one network device and two network devices. When a fault occurs on a dedicated line connecting two network devices, an alternative path is established by using the link aggregation path. Also, two network devices are operated as an active system and a standby system for a control plane such as synchronization of path information between the devices, and are both used in an active state for a data plane.

Japanese Patent Application Laid-Open Publication No. 2012-209984 (Patent Document 2) discloses a configuration in which an inter-device link aggregation is set on each link between a customer edge in a user network and two provider edges in a MPLS network. When both of the two provider edges receive a packet from a different provider edge, only one of the two provider edges relays the packet to the customer edge based on a rule made in advance between the two provider edges.

SUMMARY OF THE INVENTION

For example, as described in the Patent Document 1 and the Patent Document 2, a method in which an inter-device link aggregation group (hereinafter, abbreviated as LAG) is set between a user layer 2 (hereinafter, abbreviated as L2) switching device performing the L2 processes and two L2 switching devices, thereby achieving the device-level redundancy has been known. When such a method is employed, the two L2 switching devices virtually handle the ports, on which the inter-device LAG is set, as a single port. As a typical control in such a case, when a fault occurs at any of the ports on which the inter-device LAG is set, the two L2 switching devices reduce the communication to the rest of ports.

To achieve such control, the two L2 switching devices need to mutually recognize the states (typically, presence and absence of fault) of the ports on which the inter-device LAG is set. As one specific method thereof, various kinds of information are exchanged through the communication of control frames between the two L2 switching devices. In such a case, however, if a fault occurs on a communication line connecting the two L2 switching devices, it becomes impossible to properly control the inter-device LAG.

For the prevention of such a problem, as described in the Patent Document 1, a method of establishing an alternative path by using a LAG path (i.e., path via the user L2 switching device) when a fault occurs on the communication line connecting the two L2 switching devices has been proposed. Specifically, although the user L2 switching device usually prohibits the looping back of a frame between ports on which the LAG is set, a mechanism capable of canceling the prohibition of the looping back is provided in the user L2 switching device for establishing the alternative path. To achieve such a method, however, the two L2 switching devices as well as the user L2 switching device must have a special function.

The present invention has been made in view of the problem above, and an object thereof is to provide a relay system and a switching device capable of easily achieving the improvement of the availability.

The above and other objects and novel characteristics of the present invention will be apparent from the description of the present specification and the accompanying drawings.

The following is a brief description of an outline of the typical embodiment of the invention disclosed in the present application.

A relay system according to the present embodiment includes first to fourth switching devices. Each of the first switching device and the second switching device has an upper link port, a MCLAG port, and a bridge port, and the first switching device and the second switching device are connected to each other by a communication line via the bridge ports. The third switching device is connected to the MCLAG port of the first switching device and to the MCLAG port of the second switching device via different communication lines, and the third switching device sets a link aggregation on ports serving as connection sources of the communication lines. The fourth switching device is disposed on a communication path between the upper link port of the first switching device and the upper link port of the second switching device, and the fourth switching device constitutes a ring network together with the first switching device and the second switching device. Here, each of the first switching device and the second switching device includes first to third fault monitoring units and a MCLAG control unit. The first fault monitoring unit monitors presence and absence of a fault on a communication path between the bridge ports. The second fault monitoring unit monitors presence and absence of a fault on a communication path via the ring network between the upper link ports. The third fault monitoring unit monitors presence and absence of a fault at the MCLAG port. The MCLAG control unit transmits a fault notification frame when a monitoring result by the third fault monitoring unit changes from absence of fault to presence of fault. At this time, when a monitoring result by the first fault monitoring unit is absence of fault, the MCLAG control unit transmits the fault notification frame from the bridge port. Meanwhile, when the monitoring result by the first fault monitoring unit is presence of fault and a monitoring result by the second fault monitoring unit is absence of fault, the MCLAG control unit transmits the fault notification frame from the upper link port.

The effects obtained by typical embodiments of the invention disclosed in the present application will be briefly described below. That is, in a relay system and a switching device using a device-level redundancy, the improvement of the availability can be easily achieved.

BRIEF DESCRIPTIONS OF THE DRAWINGS

FIG. 9A is a schematic diagram of a configuration example of an address table of FIG. 8;

FIG. 9B is a schematic diagram of a configuration example of a port control table of FIG. 8.

DESCRIPTIONS OF THE PREFERRED EMBODIMENTS

Figure 1:
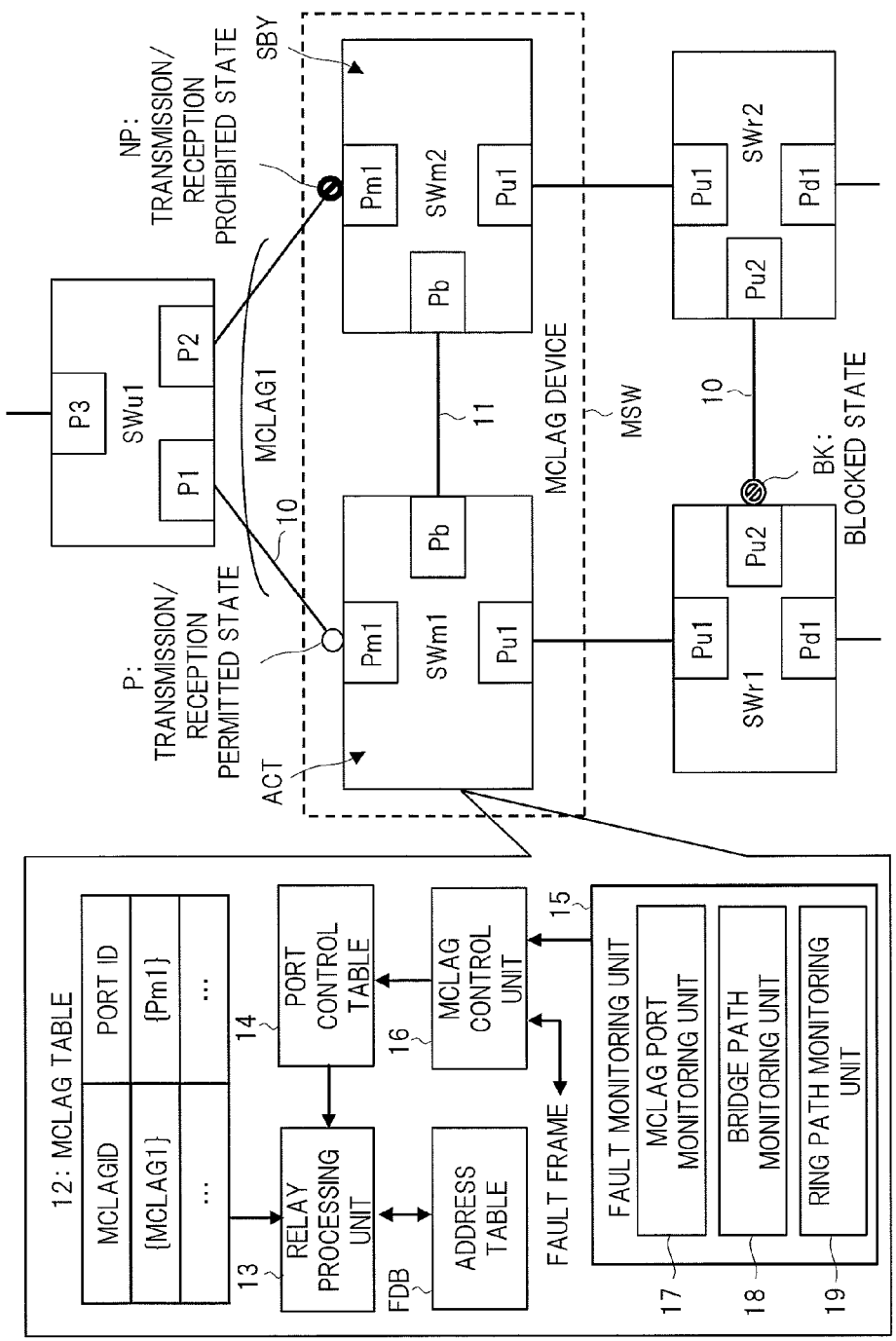
FIG. 1 is a schematic diagram showing a configuration example of a relay system according to an embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently eliminated in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

<<General Configuration of Relay System>>

FIG. 1 is a schematic diagram showing a configuration example of a relay system according to an embodiment of the present invention. The relay system of FIG. 1 includes two L2 switching devices (first and second switching devices) SWm1 and SWm2 to which an inter-device LAG is applied, a user L2 switching device (third switching device) SWu1, and a plurality of ring-configuring L2 switching devices (fourth switching devices) SWr1 and SWr2.

Each of the L2 switching devices SWm1 and SWm2 has an upper link port Pu1, a MCLAG port Pm1, and a bridge port Pb. The L2 switching device (first switching device) SWm1 and the L2 switching device (second switching device) SWm2 are connected by a communication line 11 via the bridge ports Pb. The communication line 11 is provided as, for example, an ordinary communication line (e.g., Ethernet (registered trademark) line) or a dedicated line.

The user L2 switching device (third switching device) SWu1 has a plurality of (here, two) LAG ports P1 and P2 and a port P3. The L2 switching device SWu1 is connected to the MCLAG port Pm1 of the L2 switching device SWm1 and to the MCLAG port Pm1 of the L2 switching device SWm2 via different communication lines 10. In this example, the LAG port P1 is connected to the MCLAG port Pm1 of the L2 switching device SWm1, and the LAG port P2 is connected to the MCLAG port Pm1 of the L2 switching device SWm2. Though not particularly limited, terminals etc. are connected to the port P3. The communication line 10 is provided as, for example, an Ethernet line.

Here, the L2 switching device (third switching device) SWu1 sets LAG on the LAG ports P1 and P2 serving as connection sources of the communication lines 10 between the L2 switching device SWu1 and the L2 switching devices SWm1 and SWm2. In general, the LAG is applied to a plurality of communication lines between one device and another device. In this example, however, the LAG is applied to a plurality of communication lines between one device and two devices. In this specification, therefore, such an inter-device LAG is distinguished from an ordinary LAG and is referred to as multi-chassis link aggregation group (hereinafter, abbreviated as "MCLAG"). The L2 switching device SWu1 thus sets a MCLAG1 on the LAG ports P1 and P2.

Also, in this specification, the two L2 switching devices SWm1 and SWm2, to which such an inter-device LAG is applied, are collectively referred to as MCLAG device MSW. The user L2 switching device SWu1 operates while regarding the MCLAG device MSW virtually as a single device. Actually, the L2 switching device SWu1 handles the ports (P1 and P2), on which the MCLAG1 is set, as LAG ports without particularly distinguishing the MCLAG and the LAG.

The ring-configuring L2 switching devices (fourth switching devices) SWr1 and SWr2 are disposed on a communication path between the upper link port Pu1 of the L2 switching device SWm1 and the upper link port Pu1 of the L2 switching device SWm2. The L2 switching devices SWr1 and SWr2 make up a ring network together with the L2 switching devices SWm1 and SWm2.

Specifically, each of the L2 switching devices SWr1 and SWr2 has two upper link ports Pu1 and Pu2 and a lower link port Pd1. In this example, the upper link ports Pu1 of the L2 switching device SWr1 and the L2 switching device SWm1 are connected to each other via the communication line 10 and the upper link ports Pu1 of the L2 switching device SWr2 and the L2 switching device SWm2 are connected to each other via the communication line 10, respectively. Also, the upper link ports Pu2 of the L2 switching device SWr1 and the L2 switching device SWr2 are connected to each other via the communication line 10. Though not particularly limited, terminals, etc. are connected to the lower link ports Pd1 of the L2 switching devices SWr1 and SWr2.

The L2 switching devices SWm1 and SWm2 constituting the MCLAG device MSW and the ring-configuring L2 switching devices SWr1 and SWr2 have various functions for executing a predetermined ring protocol. Various types of ring protocols have been widely known, and the types of ring protocols are not particularly limited in the present embodiment. According to an ordinary ring protocol, any one of the ports in the ring network is controlled to a blocked state BK in order to prevent the frame looping. The port controlled to the blocked state BK prohibits the passage of a normal frame (referred to as user frame in this specification) other than management and control frames. However, when a fault occurs in the ring network, the port controlled to the blocked state BK is controlled to an open state in which the passage of a frame (user frame) is permitted. In FIG. 1, as an example, the upper link port Pu2 of the L2 switching device SWr1 is controlled to the blocked state BK.

In the example of FIG. 1, the number of ring-configuring L2 switching devices SWr1 and SWr2 is two, but the number is not limited to this and one or three or more ring-configuring L2 switching devices may be provided. Also, the number of MCLAG is not limited to one and a plurality of MCLAGs may be set. Specifically, the relay system may have the configuration in which each of the L2 switching devices SWm1 and SWm2 constituting the MCLAG device MSW has a plurality of MCLAG ports and a plurality of user switching devices are connected to each of the MCLAG ports via inter-device LAG. Also, each of the L2 switching devices SWm1 and SWm2 has one MCLAG port corresponding to one MCLAG in this example, but may be configured to have a plurality of MCLAG ports corresponding to one MCLAG.

Each of the L2 switching devices (first and second switching devices) SWm1 and SWm2 has a MCLAG table 12, a relay processing unit 13, an address table FDB, a port control table 14, a fault monitoring unit 15, and a MCLAG control unit 16. The MCLAG table 12 retains the MCLAG port Pm1 (actually, port identifier {Pm1} thereof) of its own switching device in association with a MCLAG identifier {MCLAG1}. In this specification, for example, {AA} represents an identifier (ID) for "AA".

For example, it is determined in advance that the MCLAG device commonly uses the MCLAG identifier {MCLAG1}. Each of the L2 switching devices SWm1 and SWm2 constituting the MCLAG device determines the port identifier {Pm1} of its own MCLAG port to be assigned to the MCLAG identifier {MCLAG1} based on its own MCLAG table 12.

The fault monitoring unit 15 has a MCLAG port monitoring unit 17, a bridge path monitoring unit 18, and a ring path monitoring unit 19. The MCLAG port monitoring unit (third fault monitoring unit) 17 monitors the presence and absence of a fault at the MCLAG port Pm1 of its own switching device. The bridge path monitoring unit (first fault monitoring unit) 18 monitors the presence and absence of a fault on a communication path between the bridge ports Pb of the MCLAG device MSW. The ring path monitoring unit (second fault monitoring unit) 19 monitors the presence and absence of a fault on a communication path established via the ring network between the upper link ports Pu1 of the MCLAG device MSW.

Specifically, the fault monitoring unit 15 detects the presence and absence of a fault by using hardware typified by a circuit which detects the signal intensity of a received signal and a circuit which detects a pulse signal such as FLP (Fast Link Pulse). The fault monitoring unit 15 monitors the presence and absence of a fault by using a predetermined control frame (e.g., hello frame) in addition to or in place of the hardware.

Specifically, the bridge path monitoring unit (first fault monitoring unit) 18 monitors the presence and absence of a fault by transmitting and receiving main hello frames (first control frames) at regular intervals between the bridge ports Pb of the MCLAG device MSW. When the bridge port Pb cannot receive a main hello frame for a predetermined period, the bridge path monitoring unit 18 determines that the communication path between the bridge ports Pb has a fault. In the same manner, the ring path monitoring unit (second fault monitoring unit) 19 monitors the presence and absence of a fault by transmitting and receiving sub-hello frames (second control frames) at regular intervals between the upper link ports Pu1 of the MCLAG device MSW via the ring network. When the upper link port Pu1 cannot receive a sub-hello frame for a predetermined period, the ring path monitoring unit 19 determines that the communication path between the upper link ports Pu1 has a fault.

The MCLAG control unit 16 carries out various controls necessary for causing the L2 switching devices SWm1 and SWm2 to operate as the MCLAG device MSW. As one of the controls, the MCLAG control unit 16 transmits a fault notification frame which is one of fault frames when the monitoring result by the MCLAG port monitoring unit (third fault monitoring unit) 17 changes from the absence of fault to the presence of fault. At this time, when the monitoring result by the bridge path monitoring unit (first fault monitoring unit) 18 is the absence of fault, the MCLAG control unit 16 transmits the fault notification frame from the bridge port Pb. Meanwhile, when the monitoring result by the bridge path monitoring unit 18 is the presence of fault and the monitoring result by the ring path monitoring unit (second fault monitoring unit) 19 is the absence of fault, the MCLAG control unit 16 transmits the fault notification frame from the upper link port Put.

In this embodiment, for example, when there is no fault and the MCLAG control unit 16 is set to active ACT, the MCLAG control unit 16 controls the MCLAG port Pm1 to a transmission/reception permitted state (first state) P in which transmission and reception of the user frame are both permitted. On the other hand, when there is no fault and the MCLAG control unit 16 is set to standby SBY, the MCLAG control unit 16 controls the MCLAG port Pm1 to a transmission/reception prohibited state (second state) NP in which transmission and reception of the user frame are both prohibited. The second state is required to be a state in which at least transmission is prohibited. In this embodiment, for convenience, the case where the second state is the transmission/reception prohibited state NP is taken as an example.

Further, when the MCLAG control unit 16 is set to active ACT and a fault notification frame is transmitted, the MCLAG control unit 16 changes the state of the MCLAG port Pm1 from the transmission/reception permitted state P to the transmission/reception prohibited state NP. Meanwhile, when the MCLAG control unit 16 is set to standby SBY and a fault notification frame is received, the MCLAG control unit 16 changes the state of the MCLAG port Pm1 from the transmission/reception prohibited state NP to the transmission/reception permitted state P.

In the example of FIG. 1, since there is no fault and the MCLAG control unit 16 is set to active ACT, the MCLAG control unit 16 of the L2 switching device SWm1 controls the MCLAG port Pm1 to the transmission/reception permitted state P. At this time, for example, the MCLAG control unit 16 controls the MCLAG port Pm1 to the transmission/reception permitted state P by using the port control table 14 which manages each port and the control state of each port. Meanwhile, since there is no fault and the MCLAG control unit 16 is set to standby SBY, the MCLAG control unit 16 of the L2 switching device SWm2 controls the MCLAG port Pm1 to the transmission/reception prohibited state NP. At this time, for example, the MCLAG control unit 16 controls the MCLAG port Pm1 to the transmission/reception prohibited state NP by using the port control table 14.

When the MCLAG port Pm1 of its own switching device is controlled to the transmission/reception permitted state (first state) P (in the case of the switching device SWm1), the relay processing unit 13 relays a frame containing the MCLAG identifier {MCLAG1} as a destination port to the MCLAG port Pm1 of its own switching device. Meanwhile, when the MCLAG port Pm1 of its own switching device is controlled to the transmission/reception prohibited state (second state) NP (in the case of the switching device SWm2), the relay processing unit 13 relays a frame containing the MCLAG identifier {MCLAG1} as a destination port to the bridge port Pb.

Here, the frame destination port is determined based on the retrieval result on the address table FDB. It is widely known that the address table FDB retains the correspondence relation between a port and a MAC (Media Access Control) address present ahead of the port. The relay processing unit 13 carries out, for example, the following process for the address table FDB.

When a port having received a frame is the MCLAG port Pm1 of its own switching device, the relay processing unit 13 determines the MCLAG identifier {MCLAG1} corresponding to the MCLAG port to be a reception port identifier. The relay processing unit 13 then learns a source MAC address contained in the frame in association with the reception port identifier to the address table FDB. Also, the relay processing unit 13 retrieves a destination port corresponding to a destination MAC address contained in a frame received at a predetermined port from the address table FDB.

When the destination port corresponding to the destination MAC address is a MCLAG identifier based on the retrieval result and the MCLAG port of its own switching device corresponding to the MCLAG identifier is controlled to the transmission/reception prohibited state NP, the relay processing unit 13 relays a frame, to which a reception port identifier is added, to the bridge port Pb. Furthermore, when a frame to which a reception port identifier is added is received at the bridge port Pb, the relay processing unit 13 learns the source MAC address contained in the frame in association with the reception port identifier added to the frame to the address table FDB.

Through the operations by the relay processing unit 13 and the MCLAG control unit 16 described above, the L2 switching devices SWm1 and SWm2 constituting the MCLAG device MSW can be operated as the active/standby type MCLAG devices. Specifically, for example, since a frame is transmitted from only one of the two MCLAG ports Pm1 (Pm1 of SWm1 in this case), the looping back and the duplicate transmission of frames in the MCLAG1 can be prevented. Also, when a fault occurs at the active MCLAG port Pm1, the control states of respective MCLAG ports Pm1 of the L2 switching device SWm1 and SWm2 can be switched in accordance with a fault notification frame.

However, the method of realizing the MCLAG device is not limited to this, and a different method may be employed. For example, an active/active type MCLAG device may be used. In such a case, the MCLAG device needs to carry out the control for selecting one of two MCLAG ports Pm1 for each frame and the control for preventing the looping back and the duplicate transmission of frames. In order to properly realize such control even when a fault occurs at the MCLAG port Pm1, each of the L2 switching devices SWm1 and SWm2 needs to recognize the presence and absence of a fault at each MCLAG port Pm1 by using a fault notification frame in the same manner as in the case of FIG. 1.

<<Premise Operation of Relay System (in the Absence of Fault)>>

Figure 2:
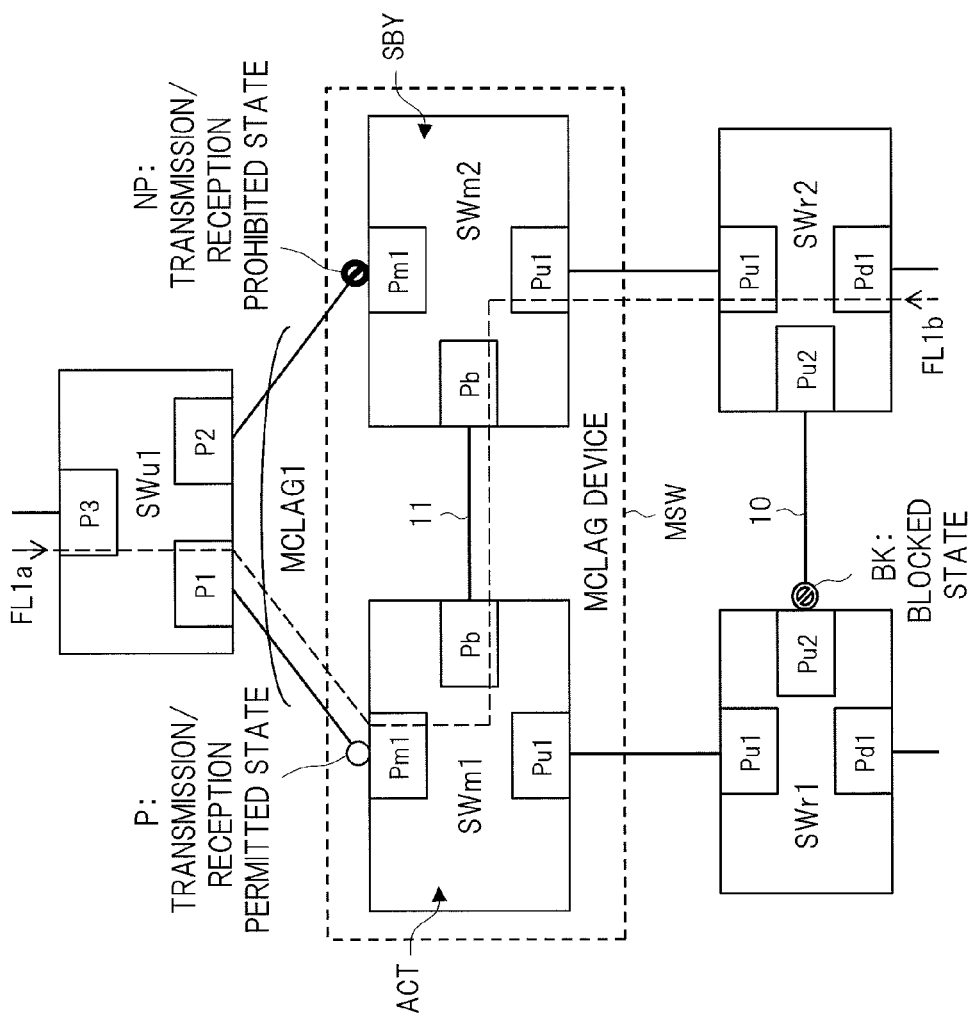
FIG. 2 is an explanatory diagram schematically showing an operation example in the absence of fault to be a premise of the relay system of FIG. 1.

FIG. 2 is an explanatory diagram schematically showing an operation example in the absence of fault to be a premise of the relay system of FIG. 1. Here, the case where a frame is transmitted and received between a terminal connected to the port P3 of the user L2 switching device SWu1 and a terminal connected to the lower link port Pd1 of the ring-configuring L2 switching device SWr2 is taken as an example. It is assumed in this case that the L2 switching device SWu1 recognizes in advance the transmission/reception prohibited state NP of the MCLAG port Pm1 of the L2 switching device SWm2 and eliminates the LAG port P2 from candidates for transmission port (P1, P2) when transmitting a frame to the MCLAG1.

First, the case where the user L2 switching device SWu1 relays a frame FL1a received at the port P3 to the LAG port P1 is assumed. The L2 switching device SWm1 receives the frame FL1a at the MCLAG port Pm1, and learns a source MAC address of the frame FL1a in association with the reception port identifier {MCLAG1} to the address table FDB as described above with reference to FIG. 1.

Also, the L2 switching device SWm1 retrieves a destination port corresponding to a destination MAC address of the frame FL1a from the address table FDB, and acquires the port identifier {Pb} of the bridge port Pb as the retrieval result thereof. In this case, since the upper link port Pu2 of the ring-configuring L2 switching device SWr1 is controlled to the blocked state BK in the ring network, the L2 switching device SWm1 learns the destination MAC address in association with the port identifier {Pb} of the bridge port Pb to the address table FDB. Based on the retrieval result of the destination port, the L2 switching device SWm1 relays the frame FL1a, to which the reception port identifier {MCLAG1} is added, to the bridge port Pb as described above with reference to FIG. 1.

The L2 switching device SWm2 receives the frame FL1a, to which the reception port identifier {MCLAG1} is added, at the bridge port Pb, and learns the source MAC address thereof in association with the reception port identifier {MCLAG1} to the address table FDB. Also, the L2 switching device SWm2 retrieves the destination port corresponding to the destination MAC address of the frame FL1a from the address table FDB, and acquires the port identifier {Pu1} of the upper link port Pu1 as the retrieval result thereof. Based on the retrieval result of the destination port, the L2 switching device SWm2 relays the frame FL1a to the upper link port Pu1.

The ring-configuring L2 switching device SWr2 receives the frame FL1a at the upper link port Pu1, and learns the source MAC address thereof in association with the port identifier {Pu1} to the address table FDB. Also, the L2 switching device SWr2 retrieves the destination port corresponding to the destination MAC address of the frame FL1a from the address table FDB, and relays the frame FL1*a* to the lower link port Pd1 based on the retrieval result thereof.

Next, the case where the ring-configuring L2 switching device SWr2 relays a frame FL1*b* received at the lower link port Pd1 to the upper link port Pu1 is assumed. The L2 switching device SWm2 receives the frame FL1*b* at the upper link port Pu1, and learns a source MAC address of the frame FL1*b* in association with the port identifier {Pu1} to the address table FDB.

Also, the L2 switching device SWm2 retrieves a destination port corresponding to a destination MAC address of the frame FL1*b* from the address table FDB, and acquires the MCLAG identifier {MCLAG1} as the retrieval result thereof. Since its own MCLAG port Pm1 corresponding to the MCLAG identifier {MCLAG1} is controlled to the transmission/reception prohibited state NP, the L2 switching device SWm2 relays the frame FL1*b* to the bridge port Pb as described above with reference to FIG. 1.

The L2 switching device SWm1 receives the frame FL1*b* at the bridge port Pb, and learns the source MAC address thereof in association with the port identifier {Pb} to the address table FDB. Also, the L2 switching device SWm1 retrieves the destination port corresponding to the destination MAC address of the frame FL1*b* from the address table FDB, and acquires the MCLAG identifier {MCLAG1} as the retrieval result thereof. Since its own MCLAG port Pm1 corresponding to the MCLAG identifier {MCLAG1} is controlled to the transmission/reception permitted state P, the L2 switching device SWm1 relays the frame FL1*b* to the MCLAG port Pm1. The user L2 switching device SWu1 receives the frame FL1*b* at the LAG port P1, carries out learning and retrieval on the address table, and then relays the frame FL1*b* to the port P3.

<<Premise Operation of Relay System (in the Occurrence of Fault at MCLAG Port)>>

Figure 3:
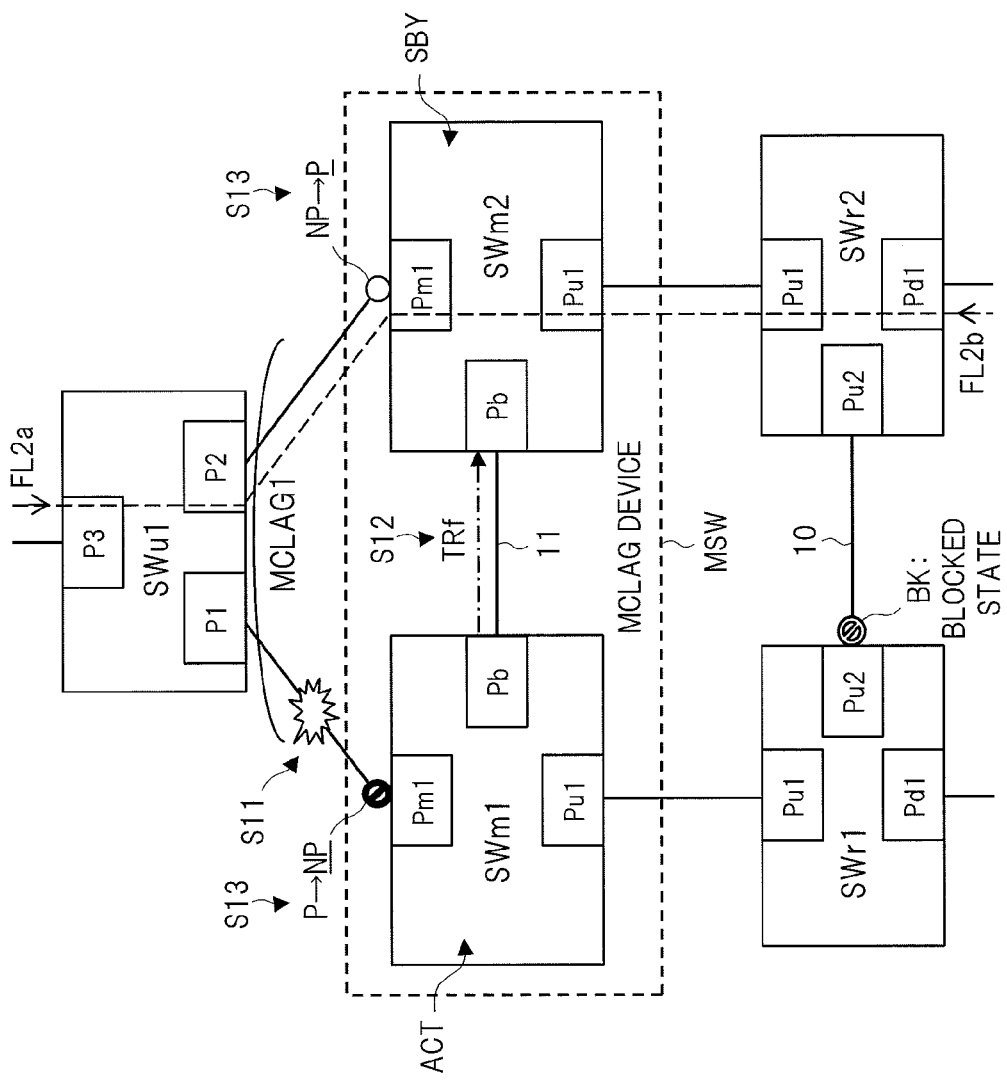
FIG. 3 is an explanatory diagram schematically showing an operation example in the occurrence of fault at a MCLAG port to be a premise of the relay system of FIG. 1.

FIG. 3 is an explanatory diagram schematically showing an operation example in the occurrence of fault at a MCLAG port to be a premise of the relay system of FIG. 1. Here, the case where a fault occurs on the communication line 10 connected to the MCLAG port Pm1 of the L2 switching device SWm1 in the state of the absence of fault shown in FIG. 2 is taken as an example. First, the MCLAG port monitoring unit 17 of the L2 switching device SWm1 detects a fault occurrence at the MCLAG port Pm1 (step S11). In response to the detection of the fault occurrence, the MCLAG control unit 16 of the L2 switching device SWm1 transmits a fault notification frame TRf containing information of the place of fault occurrence (e.g., {MCLAG1} of SWm1) to the bridge port Pb (step S12).

Also, since the fault notification frame TRf is transmitted, the MCLAG control unit 16 of the L2 switching device SWm1 controls the state of the MCLAG port Pm1 from the transmission/reception permitted state P to the transmission/reception prohibited state NP (step S13). Meanwhile, since the fault notification frame TRf is received, the MCLAG control unit 16 of the L2 switching device SWm2 controls the state of the MCLAG port Pm1 of its own switching device constituting the same MCLAG together with the place of fault occurrence ({MCLAG1} of SWm1) from the transmission/reception prohibited state NP to the transmission/reception permitted state P (step S13).

The user L2 switching device SWu1 detects a fault occurrence at the LAG port P1 and recognizes the transmission/reception permitted state P of the MCLAG port Pm1 of the L2 switching device SWm2. As a result, the L2 switching device SWu1 eliminates the LAG port P1 from candidates for transmission port when transmitting a frame to the MCLAG1, and adds the LAG port P2 to the candidates for transmission port.

In such a situation, the case where the user L2 switching device SWu1 relays a frame FL2*a* received at the port P3 to the LAG port P2 is assumed. In this case, the L2 switching device SWm2 receives the frame FL2*a* at the MCLAG port Pm1, and learns a source MAC address of the frame FL2*a* in association with the reception port identifier {MCLAG1} to the address table FDB.

Also, the L2 switching device SWm2 retrieves a destination port corresponding to a destination MAC address of the frame FL2*a* from the address table FDB, and acquires the port identifier {Pu1} of the upper link port Pu1 as the retrieval result thereof. More specifically, according to the location of a port controlled to the blocked state BK in the ring network, the L2 switching device SWm2 learns the destination MAC address in association with the port identifier {Pu1} of the upper link port to the address table FDB. Based on the retrieval result of the destination port, the L2 switching device SWm2 relays the frame FL2*a* to the upper link port Pu1.

The ring-configuring L2 switching device SWr2 receives the frame FL2*a* at the upper link port Pu1, and learns the source MAC address thereof in association with the port identifier {Pu1} to the address table FDB. Also, the L2 switching device SWr2 retrieves the destination port corresponding to the destination MAC address of the frame FL2*a* from the address table FDB, and relays the frame FL2*a* to the lower link port Pd1 based on the retrieval result thereof.

Next, the case where the ring-configuring L2 switching device SWr2 relays a frame FL2*b* received at the lower link port Pd1 to the upper link port Pu1 is assumed. The L2 switching device SWm2 receives the frame FL2*b* at the upper link port Pu1, and learns a source MAC address of the frame FL2*b* in association with the port identifier {Pu1} to the address table FDB.

Also, the L2 switching device SWm2 retrieves a destination port corresponding to a destination MAC address of the frame FL2*b* from the address table FDB, and acquires the MCLAG identifier {MCLAG1} as the retrieval result thereof. Since its own MCLAG port Pm1 corresponding to the MCLAG identifier {MCLAG1} is controlled to the transmission/reception permitted state P, the L2 switching device SWm2 relays the frame FL2*b* to the MCLAG port Pm1. The user L2 switching device SWu1 receives the frame FL2*b* at the LAG port P2, carries out learning and retrieval on the address table, and then relays the frame FL2*b* to the port P3.

<<Premise Operation of Relay System (Example of Problem)>>

Figure 4:
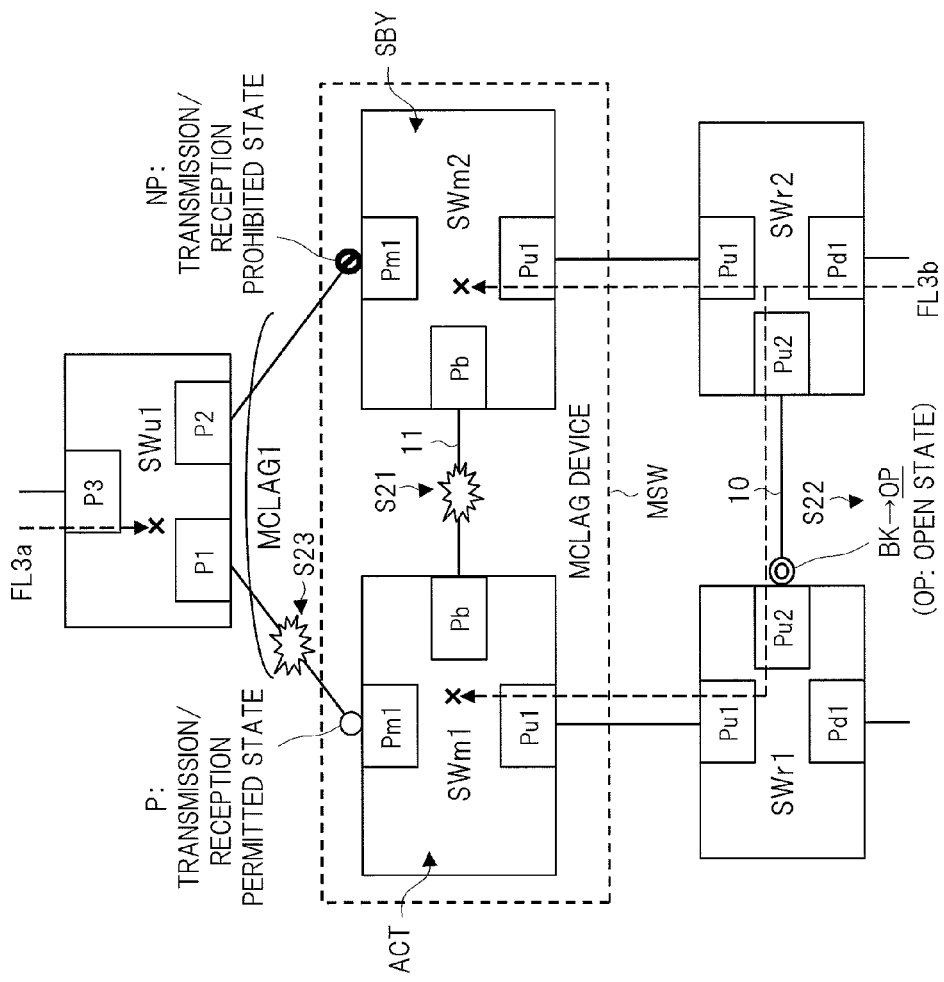
FIG. 4 is an explanatory diagram showing an example of a problem studied as a premise of the relay system of FIG. 1.

FIG. 4 is an explanatory diagram showing an example of a problem studied as a premise of the relay system of FIG. 1. In the example of FIG. 4, a fault occurs on the communication line 11 between the bridge ports Pb of the MCLAG device MSW (step S21). In response to the fault in the ring network, the ring-configuring L2 switching device SWr1 changes the state of the upper link port Pu2 from the blocked state BK to the open state OP in which the passage of user frame is permitted (step S22).

In this situation, the case where a fault occurs on the communication line 10 connected to the MCLAG port Pm1 of the L2 switching device SWm1 like the case of FIG. 3 is assumed. Although the L2 switching device SWm1 detects a fault occurrence at the MCLAG port Pm1 (step S23), the L2 switching device SWm1 cannot transmit the fault notification frame TRf from the bridge port Pb like the case of FIG. 3 because of the fault at the bridge port Pb. As a result, the MCLAG port Pm1 of the L2 switching device SWm2 remains in the transmission/reception prohibited state NP.

Consequently, the user L2 switching device SWu1 no longer has any candidates for transmission port when transmitting a frame FL3a received at the port P3 to the MCLAG1. Specifically, a communication path leading from the terminal connected to the port P3 of the user L2 switching device SWu1 to the terminal connected to the lower link port Pd1 of the ring-configuring L2 switching device SWr2 does not exist, and the communication path in a reverse direction does not exist, either. For example, even if the ring-configuring L2 switching device SWr2 floods a frame FL3b received at the port P3, the frame FL3b does not reach the destination terminal.

For the solution of such a problem, for example, the use of a method in which, when each of the L2 switching devices SWm1 and SWm2 constituting the MCLAG device MSW detects the fault occurrence at the bridge port Pb, the L2 switching devices SWm1 and SWm2 control their own MCLAG ports Pm1 to the transmission/reception permitted state P is proposed. In this case, since the MCLAG port Pm1 of the L2 switching device SWm2 is controlled to the transmission/reception permitted state P, the above-described communication paths between respective terminals are established. However, although the control like this poses no problem when the fault of step S23 is present, a problem may arise when the fault is not present. Specifically, if the MCLAG port Pm1 of the L2 switching device SWm2 is controlled to the transmission/reception permitted state P when the fault is not present, for example, a loop path from the L2 switching device SWu1 through SWm2, SWr2, SWr1 and SWm1 to SWu1 is created.

<<Operation of Relay System (in the Absence of Fault)>>

Figure 5:
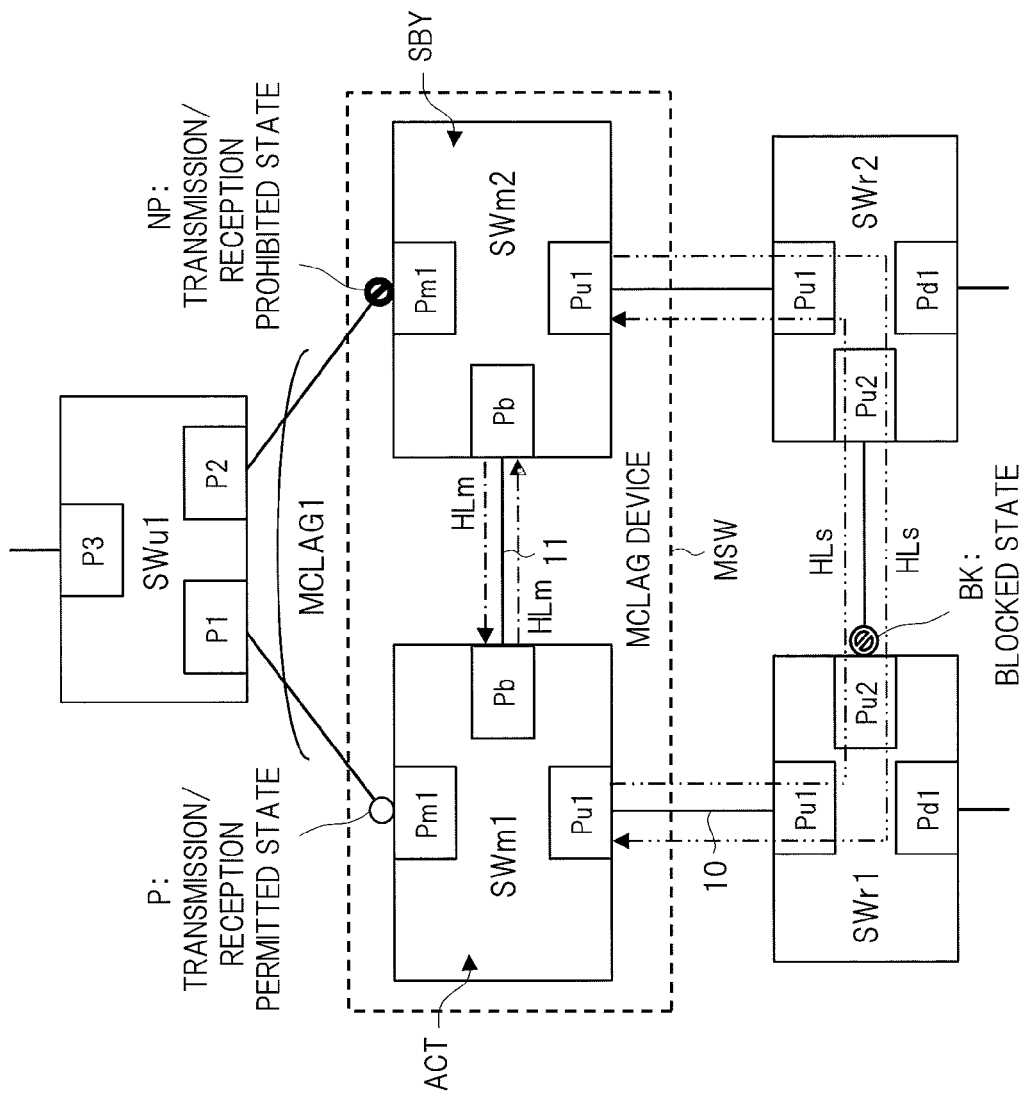
FIG. 5 is an explanatory diagram schematically showing an operation example in the absence of fault in the relay system of FIG. 1.

FIG. 5 is an explanatory diagram schematically showing an operation example in the absence of fault in the relay system of FIG. 1. As shown in FIG. 5, the bridge path monitoring units 18 of the L2 switching devices SWm1 and SWm2 constituting the MCLAG device MSW transmit main hello frames (first control frames) HLm from the bridge ports Pb to each other at regular intervals. Also, the ring path monitoring units 19 of the L2 switching devices SWm1 and SWm2 transmit sub-hello frames (second control frames) HLs from the upper link ports Pu1 to each other at regular intervals. At this time, in the ring network, ports including the upper link port Pu2 of the L2 switching device SWr1 are set so as to permit the passage of the sub-hello frames HLs by the setting of the VLAN (Virtual Local Area Network), etc.

The bridge path monitoring unit 18 monitors the communication path between the bridge ports Pb depending on whether the bridge path monitoring unit 18 can receive the main hello frame HLm within a predetermined period in accordance with a transmission interval of the main hello frame, and the ring path monitoring unit 19 also monitors the communication path between the upper link ports Pu1 depending on whether the ring path monitoring unit 19 can receive the sub-hello frame HLs within a predetermined period. As described above with reference to FIG. 1, the monitoring method by the bridge path monitoring unit 18 and the ring path monitoring unit 19 is not limited to the method using the hello frames, and the method using the detecting circuit formed by hardware may be used in combination.

In the case of FIG. 5, since the L2 switching device SWm1 can receive the main hello frame HLm (and the sub-hello frames HLs) normally, the L2 switching device SWm1 determines that the communication path between the bridge ports Pb has no fault. Therefore, when the fault indicated at step S11 of FIG. 3 occurs in such a situation, for example, the L2 switching device SWm1 transmits the fault notification frame TRf from the bridge port Pb in the same manner as in the case of FIG. 3, and the same operation as in the case of FIG. 3 is performed thereafter.

<<Operation of Relay System (in the Occurrence of Fault at Bridge Port>>

Figure 6:
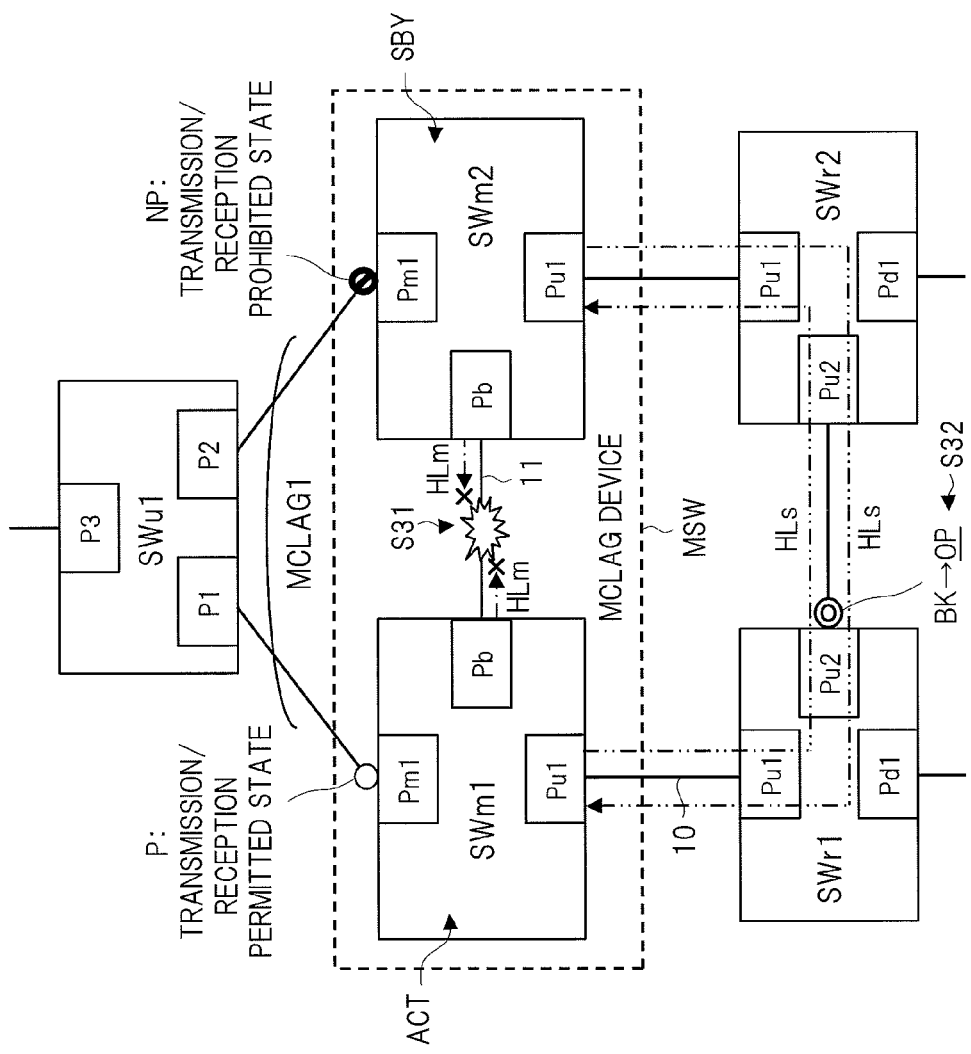
FIG. 6 is an explanatory diagram schematically showing an operation example in the occurrence of fault at the bridge port in the relay system of FIG. 1.

FIG. 6 is an explanatory diagram schematically showing an operation example in the occurrence of fault at the bridge port in the relay system of FIG. 1. In the example of FIG. 6, a fault occurs on the communication line 11 between the bridge ports Pb. Since the bridge path monitoring unit 18 of the L2 switching device SWm1 cannot receive a main hello frame HLm normally, the bridge path monitoring unit 18 determines that the communication path between the bridge ports Pb has a fault (step S31). Also, since the ring path monitoring unit 19 of the L2 switching device SWm1 can receive a sub-hello frame HLs normally, the ring path monitoring unit 19 determines that the communication path between the upper link ports Put has no fault.

More specifically, the communication path includes a transmission path and a reception path. For example, when the L2 switching device SWm2 cannot receive a main hello frame HLm from the L2 switching device SWm1, the L2 switching device SWm2 transmits a main hello frame HLm, to which information indicative of the non-reception is added, to the L2 switching device SWm1. The L2 switching device SWm1 determines that the communication path between the bridge ports Pb has a fault when it cannot receive a main hello frame HLm from the L2 switching device SWm2 as well as when it receives the main hello frame HLm to which information indicative of the non-reception is added. The process like this is carried out also for the sub-hello frame HLs in the same manner.

The ring-configuring L2 switching device SWr1 detects the fault in the ring network (step S31), and changes the state of the upper link port Pu2 from the blocked state BK to the open state OP (step S32). Although the specific detecting methods vary depending on ring protocols, a method using a hello frame and a method using a trap frame are typically proposed. In the method using the hello frame, for example, the L2 switching device SWr1 transmits a hello frame from the upper link port Pu2 at regular intervals and detects a fault depending on whether the hello frame can be received at the upper link port Pu1. In the method using the trap frame, the L2 switching device (SWm1, SWm2 in this case) having detected a fault at a port in the ring network by hardware, etc. transmits a trap frame into the ring network, and the L2 switching device SWr1 detects the fault by receiving the trap frame.

<<Operation of Relay System (in the Occurrence of Fault at Bridge Port and MCLAG Port>>

Figure 7:
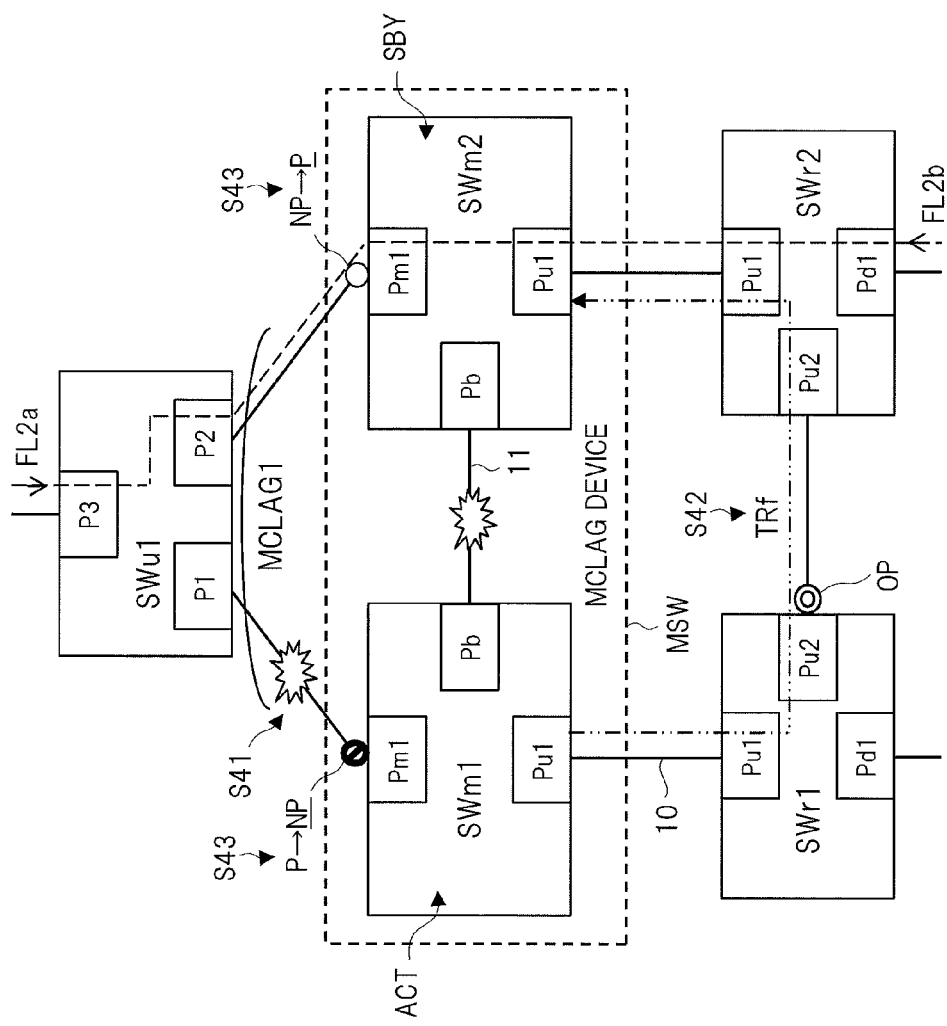
FIG. 7 is an explanatory diagram schematically showing an operation example in the occurrence of fault at the MCLAG port in addition to the bridge port in the relay system of FIG. 1.

FIG. 7 is an explanatory diagram schematically showing an operation example in the occurrence of fault at the MCLAG port in addition to the bridge port in the relay system of FIG. 1. Here, the case where a fault further occurs on the communication line 10 connected to the MCLAG port Pm1 of the L2 switching device SWm1 in the situation of FIG. 6 is taken as an example.

First, the MCLAG port monitoring unit 17 of the L2 switching device SWm1 detects a fault occurrence at the MCLAG port Pm1 (step S41). In response to the detection of the fault occurrence, the MCLAG control unit 16 of the L2 switching device SWm1 transmits a fault notification frame TRf containing information of the place of fault occurrence (e.g., {MCLAG1} of SWm1). At this time, since the monitoring result by the bridge path monitoring unit 18 is presence of fault and the monitoring result by the ring path monitoring unit 19 is absence of fault, the MCLAG control unit 16 transmits the fault notification frame TRf from the upper link port Pu1 (step S42). At this time, in the ring network, the setting to permit the passage of the fault notification frame TRf is made in advance like the case of the sub-hello frame HLs.

Also, since the MCLAG control unit 16 of the L2 switching device SWm1 receives the fault notification frame TRf, the MCLAG control unit 16 controls the state of the MCLAG port Pm1 from the transmission/reception permitted state P to the transmission/reception prohibited state NP (step S43). Meanwhile, since the MCLAG control unit 16 of the L2 switching device SWm2 receives the fault notification frame TRf at the upper link port Pu1, the MCLAG control unit 16 controls the state of the MCLAG port Pm1 of its own switching device constituting the same MCLAG together with the place of fault occurrence (e.g., {MCLAG1} of SWm1) from the transmission/reception prohibited state NP to the transmission/reception permitted state P (step S43).

As a result, the frames FL2a and FL2b are relayed in the same manner as in the case of FIG. 3. More specifically, unlike the case of FIG. 4, a bidirectional communication path is formed between the terminal connected to the port P3 of the user L2 switching device SWu1 and the terminal connected to the lower link port Pd1 of the ring-configuring L2 switching device SWr2. At this time, since the L2 switching device SWm2 controls the MCLAG port Pm1 to the transmission/reception permitted state P based on the fault notification frame TRf, the problem of looping path described above with reference to FIG. 4 does not arise.

EFFECT OF PRESENT EMBODIMENT

As described above, by using the relay system and the switching device of this embodiment, typically, the improvement of the availability can be easily achieved. Specifically, as shown in FIG. 7, even if a fault occurs on the communication path between the bridge ports Pb, the operation as the MCLAG device can be maintained through the communication in the MCLAG device MSW by using the ring network. As a result, the improvement of availability can be achieved.

Furthermore, since the L2 switching devices other than the MCLAG device MSW do not need to have a special function that is necessary for the method described in the Patent Document 1, the improvement of availability can be easily achieved. Specifically, the user L2 switching device SWu1 does not need to have a special mechanism for cancelling the prohibition of looping back in the MCLAG1 unlike the case of the Patent Document 1. Also, the ring-configuring L2 switching devices SWr1 and SWr2 are only required to simply relay the sub-hello frame HLs, the fault notification frame TRf, etc. through the ring network, and such a process can be easily realized by using the general function of the VLAN, etc.

In this embodiment, the MCLAG device MSW transmits both main hello frame HLm and sub-hello frame HLs at regular intervals. In some situations, however, the MCLAG device MSW may transmit the sub-hello frame HLs when a fault occurs on the communication path between the bridge ports Pb. More specifically, when the need of an alternative path arises, the MCLAG device MSW transmits the sub-hello frame HLs in order to check the presence and absence of fault on the path. In this case, however, since it takes time to perform the path switching operation in the occurrence of fault, it is more desirable to transmit both hello frames at regular intervals.

Furthermore, when a fault on the ring network can be detected by the predetermined ring protocol, transmission of the sub-hello frame HLs is not always necessary. Specifically, for example, the ring path monitoring unit 19 of FIG. 1 may determine the presence and absence of fault on the communication path between the upper link ports Pu1 by detecting a trap frame, etc., transmitted through the ring network when fault occurrence or recovery from fault are caused, based on the predetermined ring protocol.

Furthermore, although the port controlled to the blocked state BK in the ring network is provided at the upper link port Pu2 of the L2 switching device SWr1 in this case, the port controlled to the blocked state BK may be provided at the upper link port Pu1 of the MCLAG device MSW. In such a case, the MCLAG device MSW monitors continuity in the ring network by using, for example, the hello frame based on the ring protocol. In this case, the hello frame based on the ring protocol and the sub-hello frame HLs used for the control of the MCLAG may be treated as a common frame.

<<Configuration of Switching Device>>

Figure 8:
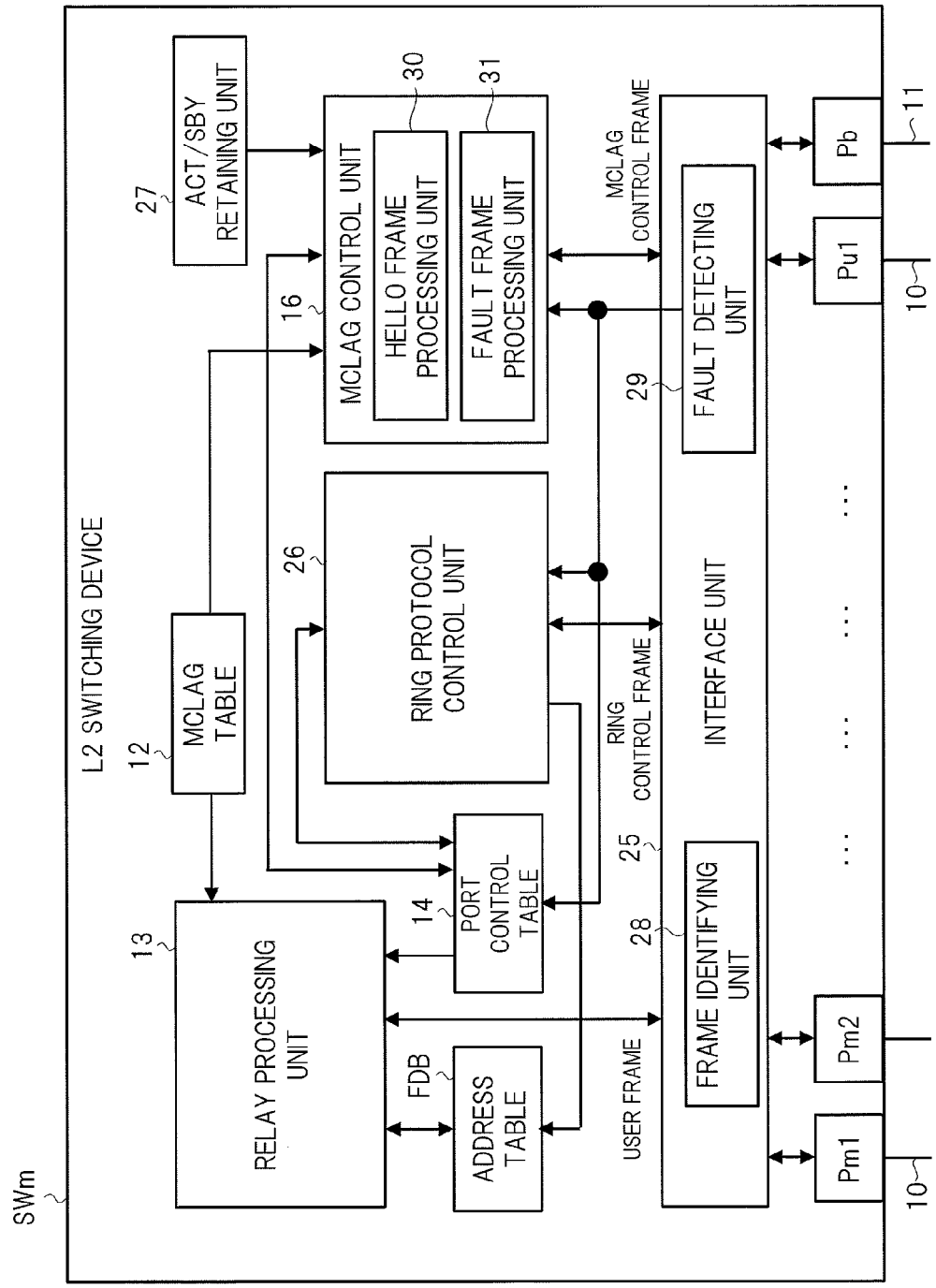
FIG. 8 is a block diagram of a configuration example of the principle part of the L2 switching device constituting the MCLAG device of the relay system of FIG. 1.

FIG. 8 is a block diagram of a configuration example of the principle part of the L2 switching device constituting the MCLAG device of the relay system of FIG. 1. FIG. 9A is a schematic diagram of a configuration example of the address table of FIG. 8, and FIG. 9B is a schematic diagram of a configuration example of the port control table of FIG. 8. The L2 switching device (first or second switching device) SWm of FIG. 8 includes a plurality of MCLAG ports Pm1, Pm2, . . . , the upper link port Pu1, the bridge port Pb, various processing units, and various tables.

Each of the plurality of MCLAG ports Pm1, Pm2, . . . is a single port or made up of a plurality of MCLAG ports. For example, the MCLAG port Pm1 may be made up of two MCLAG ports (Pm1 [1] and Pm1 [2]). Similarly, each of the upper link port Pu1 and the bridge port Pb is a single port or made up of a plurality of ports. For example, the upper link port Pu1 may be made up of two upper link ports (Pu1 [1] and Pu1 [2]) on which the LAG is set. Furthermore, the L2 switching device SWm may include a normal port on which no MCLAG is set. Hereinafter, the above-mentioned various processing units and tables will be described.

An interface unit 25 has a frame identifying unit 28 and a fault detecting unit 29, and transmits or receives a frame between each of the ports (MCLAG ports Pm1, Pm2, . . . , upper link port Pu1, and bridge port Pb). The frame identifying unit 28 identifies whether the received frame is a user frame, a ring control frame, or a MCLAG control frame. Though not particularly limited, the frame identifying unit 28 identifies the frame based on frame type and a destination MAC address (e.g., destined for MCLAG device or not) contained in the frame.

The user frame is, for example, an ordinary frame such as the frame FL1a of FIG. 2. The ring control frame means various control frames based on the predetermined ring protocol. The MCLAG control frame means the main hello frame HLm and sub-hello frame HLs of FIG. 5, the fault notification frame TRf of FIGS. 3 and 7, and a fault recovery frame described later.

The fault detecting unit 29 takes a part of the function of the fault monitoring unit 15 described with reference to FIG. 1. The fault detecting unit 29 detects the fault occurrence and the recovery from fault at each of the ports (MCLAG ports Pm1, Pm2, . . . , upper link port Pu1, and bridge port Pb) with the use of hardware such as a detection circuit of the signal intensity of the received signal and a detection circuit of a pulse signal such as FLP. Also, the fault detecting unit 29 may have a function of Ethernet OAM (Operations, Administration, and Maintenance). In this case, the fault detecting unit 29 monitors the presence and absence of a fault at the MCLAG ports Pm1 and Pm2 by using, for example, a CC (Continuity Check) function based on Ethernet OAM.

When the interface unit 25 receives a frame, for example, the interface unit 25 adds a port identifier of the port which has received the frame (reception port identifier) to the frame, and transmits the frame to a processing unit based on the identification result by the frame identifying unit 28. Specifically, when the frame is identified as a user frame, the interface unit 25 transmits the user frame to the relay processing unit 13. Also, when the frame is identified as a ring control frame, the interface unit 25 transmits the ring control frame to the ring protocol control unit 26. Furthermore, when the frame is identified as a MCLAG control frame, the interface unit 25 transmits the MCLAG control frame to the MCLAG control unit 16.

The ring protocol control unit 26 carries out various controls and processes based on the predetermined ring protocol. For example, as described above with reference to FIG. 6, when the fault detecting unit 29 detects the fault occurrence or the recovery from fault at a port in the ring network (upper link port Pu1 or bridge port Pb), the ring protocol control unit 26 transmits a trap frame into the ring network. Also, as described above with reference to FIG. 6, the ring protocol control unit 26 receives a flushing command to flush the address table FDB that is generated when the state of a control port in the ring network shifts between the blocked state BK and the open state OP, and executes the flushing command. Furthermore, the ring protocol control unit 26 carries out relaying of a hello frame, etc., based on the ring protocol.

In addition, when the switching device of the ring protocol control unit 26 functions as a master device in the ring network, the ring protocol control unit 26 transmits and receives hello frames at the upper link port Pu1 at regular intervals. In this case, according to the presence and absence of a fault in the ring network, the ring protocol control unit 26 controls the upper link port Pu1 to the blocked state BK or the open state OP by using the port control table 14.

An ACT/SBY retaining unit 27 retains setting information of active ACT or standby SBY in units of device or in units of MCLAG port determined in advance by the administrator, etc. The MCLAG table 12 retains a MCLAG port of its own switching device (e.g., Pm1) in association with a MCLAG identifier ({MCLAG1}) of the MCLAG port as shown in FIG. 1.

The MCLAG control unit 16 has a hello frame processing unit 30 and a fault frame processing unit 31, and carries out various controls and processes for properly operating the MCLAG device MSW as described above with reference to FIGS. 1 to 7. As described above with reference to FIG. 6, the hello frame processing unit 30 transmits and receives hello frames HLm and sub-hello frames HLs at regular intervals, thereby monitoring the communication path between the bridge ports Pb and the communication path between the upper link ports Pu1. More specifically, the hello frame processing unit 30 takes another part of the function of the fault monitoring unit 15 (bridge path monitoring unit 18 and ring path monitoring unit 19) described above with reference to FIG. 1.

When the fault detecting unit 29 detects a fault occurrence at any one of the MCLAG ports Pm1, Pm2, . . . , the fault frame processing unit 31 transmits a fault notification frame TRf, which is one of fault frames, to the other L2 switching device (referred to as peer device in this specification) constituting the MCLAG device MSW together with the L2 switching device SWm of the fault frame processing unit 31 as described above with reference to FIGS. 3 and 7. Similarly, when the fault detecting unit 29 detects a recovery from fault at any one of the MCLAG ports Pm1, Pm2, . . . , the fault frame processing unit 31 transmits a fault recovery frame, which is another one of fault frames, to the peer device. At this time, the fault frame processing unit 31 determines a transmission port of the fault frame based on the presence and absence of a fault on the communication path between the bridge ports Pb and the presence and absence of a fault on the communication path between the upper link ports Pu1. Also, the fault frame processing unit 31 receives a fault frame from the peer device.

As described above with reference to FIG. 2, etc., the MCLAG control unit 16 controls the state of the MCLAG ports Pm1, Pm2, . . . by using the port control table 14 based on the information (as to active ACT or standby SBY) retained by the ACT/SBY retaining unit 27. Also, as described above with reference to FIGS. 3 and 7, the MCLAG control unit 16 controls the state of the MCLAG ports Pm1, Pm2, . . . by using the port control table 14 based on the information retained by the ACT/SBY retaining unit 27 and whether the port is on a transmission side or a reception side of the fault notification frame TRf.

As shown in FIG. 9B, the port control table 14 manages port identifiers or MCLAG identifiers and the control state of ports (including MCLAG ports) corresponding to the identifiers. In the example of FIG. 9B, the MCLAG identifiers {MCLAG1} and {MCLAG2} are assigned to the MCLAG ports Pm1 and Pm2 of FIG. 8, respectively, and these are controlled to the transmission/reception permitted state P.

The relay processing unit 13 determines a destination port for a user frame from the interface unit 25 by performing the learning and retrieval on the address table FDB and reflecting information of the port control table 14 as described above with reference to FIGS. 1 to 7. Specifically, when executing the learning on the address table FDB, the relay processing unit 13 learns a source MAC address of the user frame in association with a reception port identifier added by the interface unit 25 to the address table FDB. At this time, when the reception port identifier is a port identifier of a MCLAG port based on the MCLAG table 12, the relay processing unit 13 learns the port identifier in place of the MCLAG identifier to the address table FDB.

Also, when a user frame to which a reception port identifier (MCLAG identifier) is added is received at the bridge port Pb, the relay processing unit 13 learns a source MAC address thereof in association with the reception port identifier to the address table FDB. As a result, the address table FDB retains the correspondence relation between ports and MAC addresses present ahead of the ports as shown in FIG. 9A. In FIG. 9A, a port is retained as a port identifier (e.g., {Pb}) or a MCLAG identifier (e.g., {MCLAG1}). Actually, the address table FDB retains VLAN identifiers in addition to MAC addresses.

Meanwhile, when executing the retrieval on the address table FDB, the relay processing unit 13 retrieves the address table FDB with using a destination MAC address (and a VLAN identifier) of a user frame as a retrieval key, thereby acquiring a destination port. The relay processing unit 13 judges the control state of the destination port based on the port control table 14 and then determines a final destination port. For example, when the destination port according to the retrieval result is a MCLAG identifier and the control state of the MCLAG identifier is the transmission/reception permitted state P based on the port control table 14, the relay processing unit 13 determines the MCLAG port corresponding to the MCLAG identifier to be the final destination port. The relay processing unit 13 then adds the port identifier of the MCLAG port as a destination port identifier to the user frame, and transmits the user frame to the interface unit 25.

Meanwhile, when the destination port based on the retrieval result is a MCLAG identifier and the control state of the MCLAG identifier is the transmission/reception prohibited state NP based on the port control table 14, the relay processing unit 13 determines the bridge port Pb to be the final destination port. The relay processing unit 13 then adds the port identifier {Pb} of the bridge port Pb as a destination port identifier to the user frame, and transmits the user frame to the interface unit 25. The interface unit 25 transmits the user frame received from the relay processing unit 13 from the port corresponding to the destination port identifier.

<<Structure of MCLAG Control Frame>>

Figure 10:
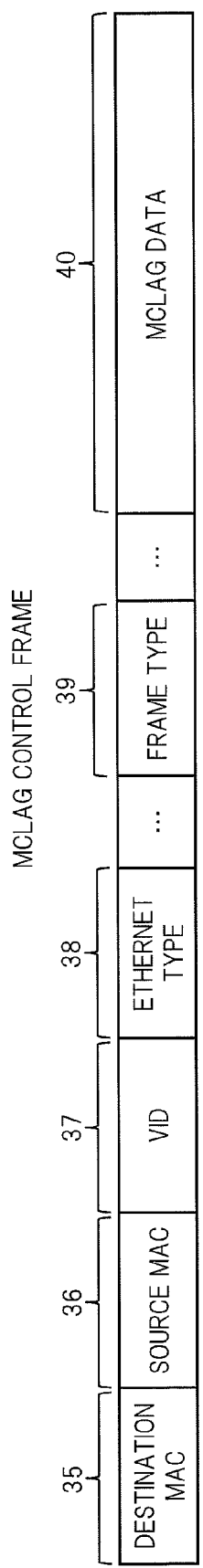
FIG. 10 is a schematic diagram of a structural example of a MCLAG control frame of FIG. 8.

FIG. 10 is a schematic diagram of a structural example of the MCLAG control frame of FIG. 8. The MCLAG control frame shown in FIG. 10 has a structure in conformity to the structure of an ordinary Ethernet frame. The MCLAG control frame of FIG. 10 contains a destination MAC address 35, a source MAC address 36, a VLAN identifier (VID) 37, an Ethernet type 38, a frame type 39, a MCLAG data 40 and others.

The VLAN identifier 37 stores a VLAN value different from a VLAN value to which the predetermined ring protocol is applied. The ring-configuring L2 switching devices SWr1 and SWr2 of FIG. 7 are set so as to permit the relaying of a frame having such a VLAN value stored in the VLAN identifier 37. As a result, the MCLAG control frame is not blocked by a control port controlled to the blocked state BK based on the ring protocol. Also, a VLAN value stored in the VLAN identifier 37 of the control frame transmitted and received between the bridge ports Pb is different from a VLAN value stored in the VLAN identifier 37 of the control frame transmitted and received between the upper link ports Pu1.

The Ethernet type 38 stores a predetermined fixed value. The frame type 39 stores an identifier for identifying each of the hello frames (main hello frame HLm and sub-hello frame HLs) and the fault frames (fault notification frame TRf and fault recovery frame) described above. The MCLAG data 40 stores necessary information in accordance with the frame type 39.

Here, the case where the monitoring result by the MCLAG port monitoring unit (third fault monitoring unit) 17 of FIG. 1 (fault detecting unit 29 of FIG. 8) is presence of fault and the bridge path monitoring unit 18 and the ring path monitoring unit 19 of FIG. 1 (hello frame processing unit 30 of FIG. 8) transmit hello frames is assumed. In other words, the case where the bridge path monitoring unit (first fault monitoring unit) 18 of FIG. 1 transmits main hello frames (first control frames) HLm at regular intervals and the ring path monitoring unit (second fault monitoring unit) 19 transmits sub-hello frames (second control frames) HLs at regular intervals is assumed.

In this case, it is desired that information indicative of the presence of fault at a MCLAG port is contained in the MCLAG data 40 of the hello frame. The information indicative of the presence of fault may be information directly indicating the presence of fault or information indirectly indicating the presence of fault such as the control state of the MCLAG port. For example, the L2 switching device SWm1 of FIG. 7 causes the L2 switching device SWm2 to recognize the control state (transmission/reception prohibited state NP) of the MCLAG port Pm1 of the L2 switching device SWm1, whereby the L2 switching device SWm2 comes to know that the MCLAG port Pm1 of the L2 switching device SWm1 has a fault.

As described above, a fault at the MCLAG port of one of the L2 switching devices SWm constituting the MCLAG device MSW can be recognized by the peer device through a fault notification frame TRf. However, if the peer device cannot normally receive the fault notification frame TRf due to a certain accidental factor, a situation where the MCLAG ports of both L2 switching devices SWm1 and SWm2 are kept controlled to the transmission/reception prohibited state NP may arise. To prevent such a situation, by adding information indicative of the presence of fault also to the hello frame and making the L2 switching device receiving the hello frame confirm the information adequately, the fault notification can be carried out more reliably.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, in the embodiments above, the example where the fault frame (fault notification frame and fault recovery frame) is transmitted through the ring network serving as an alternative path when a fault occurs on the communication path between the bridge ports Pb has been described. However, a frame to be transmitted through the alternative path is not limited to the fault frame, and various control frames necessary for properly controlling the MCLAG device MSW may also be transmitted through the alternative path.

Furthermore, the user frame may also be transmitted through the alternative path in some cases. Specifically, for example, the case where the L2 switching devices SWm1 and SWm2 in FIG. 7 further include MCLAG ports Pm2, respectively, and a MCLAG2 is set between the MCLAG ports Pm2 and another L2 switching device (SWu2) is assumed. Also, it is assumed that the MCLAG port Pm2 of the L2 switching device SWm1 is controlled to the transmission/reception permitted state P and the MCLAG port Pm2 of the L2 switching device SWm2 is controlled to the transmission/reception prohibited state NP.

In this situation, for example, in the case where a user frame is transmitted from the L2 switching device SWu1 to the L2 switching device SWu2, when the bridge ports Pb have no fault, a communication path from the L2 switching device SWu1 through SWm2 and SWm1 to SWu2 is used. Meanwhile, when the bridge ports Pb have a fault, the ring network is used as an alternative path, and a communication path from the L2 switching device SWu1 through SWm2, SWr2, SWr1 and SWm1 to SWu2 can be used. In this manner, various frames (user frame and control frame) transferred between the bridge ports Pb when the communication path between the bridge ports Pb has no fault may also be transmitted through the alternative path.

What is claimed is:

1. A relay system comprising:
a first switching device and a second switching device each having an upper link port, a MCLAG port, and a bridge port, the first switching device and the second switching device being connected to each other by a communication line via the bridge ports;
a third switching device connected to the MCLAG port of the first switching device and to the MCLAG port of the second switching device via different communication lines, the third switching device setting a link aggregation on ports serving as connection sources of the communication lines; and
a fourth switching device disposed on a communication path between the upper link port of the first switching device and the upper link port of the second switching device, the fourth switching device constituting a ring network together with the first switching device and the second switching device,
wherein each of the first switching device and the second switching device includes:
a first fault monitoring unit which monitors presence and absence of a fault on a communication path between the bridge ports;
a second fault monitoring unit which monitors presence and absence of a fault on a communication path via the ring network between the upper link ports;
a third fault monitoring unit which monitors presence and absence of a fault at the MCLAG port; and
a MCLAG control unit which transmits a fault notification frame when a monitoring result by the third fault monitoring unit changes from absence of fault to presence of fault, and
when a monitoring result by the first fault monitoring unit is absence of fault, the MCLAG control unit transmits the fault notification frame from the bridge port, and when the monitoring result by the first fault monitoring unit is presence of fault and a monitoring result by the second fault monitoring unit is absence of fault, the MCLAG control unit transmits the fault notification frame from the upper link port.

2. The relay system according to claim 1,
wherein the first fault monitoring unit monitors presence and absence of a fault by transmitting and receiving a first control frame between the bridge ports at regular intervals.

3. The relay system according to claim 2,
wherein, when the monitoring result by the third fault monitoring unit is presence of fault, the first fault monitoring unit adds information indicative of occurrence of the fault to the first control frame, and
one of the first switching device and the second switching device recognizes presence of a fault at the MCLAG port of the other of the first switching device and the second switching device based on the first control frame in addition to the fault notification frame.

4. The relay system according to claim 1,
wherein the second fault monitoring unit monitors presence and absence of a fault by transmitting and receiving a second control frame between the upper link ports via the ring network at regular intervals.

5. The relay system according to claim 4,
wherein, when the monitoring result by the third fault monitoring unit is presence of fault, the second fault monitoring unit adds information indicative of occurrence of the fault to the second control frame, and
one of the first switching device and the second switching device recognizes presence of a fault at the MCLAG port of the other of the first switching device and the second switching device based on the second control frame in addition to the fault notification frame.

6. The relay system according to claim 1,
wherein, when there is no fault and the MCLAG control unit is set to active, the MCLAG control unit controls the MCLAG port to a first state in which transmission and reception are both permitted,
when there is no fault and the MCLAG control unit is set to standby, the MCLAG control unit controls the MCLAG port to a second state in which at least transmission is prohibited,
when the MCLAG control unit is set to standby and the fault notification frame is received, the MCLAG control unit changes the MCLAG port from the second state to the first state, and
the MCLAG control unit of one of the first switching device and the second switching device is set to the active, and the MCLAG control unit of the other of the first switching device and the second switching device is set to the standby.

7. A switching device having an upper link port connected to a ring network, a MCLAG port, and a bridge port, the switching device being connected to a different switching device via the bridge port, the switching device comprising:
a first fault monitoring unit which monitors presence and absence of a fault on a communication path between the bridge port and a bridge port of the different switching device;
a second fault monitoring unit which monitors presence and absence of a fault on a communication path via the ring network between the upper link port and an upper link port of the different switching device;
a third fault monitoring unit which monitors presence and absence of a fault at the MCLAG port; and
a MCLAG control unit which transmits a fault notification frame when a monitoring result by the third fault monitoring unit changes from absence of fault to presence of fault,
wherein, when a monitoring result by the first fault monitoring unit is absence of fault, the MCLAG control unit transmits the fault notification frame from the bridge port, and when the monitoring result by the first fault monitoring unit is presence of fault and a monitoring result by the second fault monitoring unit is absence of fault, the MCLAG control unit transmits the fault notification frame from the upper link port.

8. The switching device according to claim 7,
wherein the first fault monitoring unit monitors presence and absence of a fault by transmitting and receiving a first control frame between the bridge ports at regular intervals.

9. The switching device according to claim 8,
wherein, when the monitoring result by the third fault monitoring unit is presence of fault, the first fault monitoring unit adds information indicative of occurrence of the fault to the first control frame, and the switching device recognizes presence of a fault at the MCLAG port of the different switching device based on the first control frame in addition to the fault notification frame.

10. The switching device according to claim 7,
wherein the second fault monitoring unit monitors presence and absence of a fault by transmitting and receiving a second control frame between the upper link ports via the ring network at regular intervals.

11. The switching device according to claim 10,
wherein, when the monitoring result by the third fault monitoring unit is presence of fault, the second fault monitoring unit adds information indicative of occurrence of the fault to the second control frame, and
the switching device recognizes presence of a fault at the MCLAG port of the different switching device based on the second control frame in addition to the fault notification frame.

12. The switching device according to claim 7,
wherein, when there is no fault and the MCLAG control unit is set to active, the MCLAG control unit controls the MCLAG port to a first state in which transmission and reception are both permitted,
when there is no fault and the MCLAG control unit is set to standby, the MCLAG control unit controls the MCLAG port to a second state in which at least transmission is prohibited,
when the MCLAG control unit is set to standby and the fault notification frame is received, the MCLAG control unit changes the MCLAG port from the second state to the first state, and
the switching device is set to the active when the different switching device is set to the standby, and the switching device is set to the standby when the different switching device is set to the active.

* * * * *